United States Patent [19]

Shroyer

[11] 4,326,954
[45] Apr. 27, 1982

[54] FLUID TREATING APPARATUS

[75] Inventor: Larry L. Shroyer, Union City, Mich.

[73] Assignee: Ener-Tec, Inc., Orland, Ind.

[21] Appl. No.: 107,053

[22] Filed: Dec. 26, 1979

[51] Int. Cl.³ .......................... C02F 1/46; B01D 35/06
[52] U.S. Cl. .................................. 210/222; 210/243; 210/748
[58] Field of Search .............. 210/222, 223, 748, 695, 210/243

[56] References Cited

U.S. PATENT DOCUMENTS

| 360,842 | 4/1887 | Atkins | 210/222 |
|---|---|---|---|
| 542,911 | 7/1895 | Whitacre | 210/222 |
| 1,491,600 | 4/1924 | Ternow, Jr. | 210/222 |
| 2,596,743 | 5/1952 | Vermeilen | 210/222 |
| 2,939,830 | 6/1960 | Green et al. | 210/222 |
| 4,151,090 | 4/1979 | Bryante | 210/222 |

FOREIGN PATENT DOCUMENTS 1189888  4/1970  United Kingdom .............. 210/222

Primary Examiner—Benoit Castel
Attorney, Agent, or Firm—David A. Lundy

[57] ABSTRACT

A fluid treating apparatus comprising an elongated non-magnetic tube having opposite ends. An insulated wire is wound in multilayered closely packed helical fashion about the tube between its opposite ends. The adjacent turns of the wire are electrically insulated from each other and the tube. The wound wire is encapsulated in a protective covering which envelopes the wire and a portion of the non-magnetic tube. In a specific embodiment, an indicator is incorporated with the device to indicate when the wire is energized.

6 Claims, 2 Drawing Figures

FLUID TREATING APPARATUS

BACKGROUND OF THE INVENTION

The invention relates to fluid treating apparatus, and in particular, to a fluid treating apparatus that utilizes a magnetic field.

Persons have always been concerned with treating fluids containing a variety of contaminants so as to make the fluid more useful for the purpose for which it is intended (e.g. water passing through a boiler). One of the most common fluid treating situations is the treating of calcareous water or so-called "hard" water in an effort to avoid the build-up of calcareous deposits or scale in the water handling system. Such build-ups cause decreased profits for such systems due to the time the system is shutdown and the monies expended during the cleaning and/or repair of the system.

Persons have attempted to achieve like results, i.e. the reduction of contaminant build-up, in the treatment of sewage and lime slurries. Such build-ups of likewise cause decreased profits for such systems due to the time the system is shutdown and the monies expended during the cleaning and/or repair of the system.

Thus, it would be highly desirable to provide an improved treating apparatus for fluids having contaminants therein wherein said apparatus would treat the fluid so as to reduce the build-up of contaminants in the fluid handling system, and thus reduce the amount of time the system is shutdown and the expense associated with cleaning and repairing the system.

Although not as common, other fluid treating situations include the treatment of various fuels (e.g. diesel fuel and gasoline) so that the contaminants included therein will not foul fuel injection systems and the like. Thus, it would be highly desirable to provide an improved treating apparatus for fuels having contaminants therein that would reduce the fouling of fuel injection systems and the like.

Persons have also been concerned with treating powders and flowable particulate material so as to eliminate the clogging of such handling systems. During handling, these powders and particulate materials build-up electric charges therein. These electric charges cause the powders to stick together and to equipment and to eventually clog the handling system. The clogging of the systems causes decreased profits due to the time the system is shut-down and the monies expended in cleaning and/or repairing of the system. Thus, it would be highly desirable to provide an improved treating apparatus for powders that reduces these electric charges and reduces the clogging in the system.

It has been common practice for fluids such as water and sewage to be chemically treated. It has also been common practice for these fluids to be treated by devices utilizing magnetic fields.

Fluid treating apparatus of the past utilizing magnetic fields have included coiled wires or permanent magnet assemblies extending longitudinally of and in the center of the apparatus. The fluid flow is highly baffled since the fluid must negotiate around these assemblies, and as a result thereof, high pressure drops and cleaning problems exist. See:

| U.S. Pat. No. | Title | Inventor | Issue Date |
|---|---|---|---|
| 2,825,464 | WATER TREATMENT DEVICE | Mack | March 4, 1958 |

Also, the fluid contacts the magnet coils of some of the fluid treating apparatus of the past. As a consequence thereof, higher construction costs and operating problems including short circuits exits. Examples of such apparatus are an "Electrostatic Descaler" manufactured by Finley Research & Development, a division of the Dyna-Jet Corporation, and the following United States Letters Patents are referenced in the promotional literature:

| U.S. Pat. No. | Title | Inventor | Issue Date |
|---|---|---|---|
| 3,585,122 | APPARATUS FOR TREATMENT OF FLUIDS WITH ELECTRIC FIELDS | King | June 15, 1971 |
| 3,684,575 | USE OF ELECTROSTIATIC CHARGE TO REPEL SUBSTANCES FROM SURFACE DURING CLEANING | King | August 15, 1972 |

Another example of a device where the fluid flows over the magnet assembly is an "Electr-A-Sonic" water treater believed to be distributed by Avis Distributors [geographical location unknown]. Applicant is also aware of the following U.S. Letters Patents that disclose structures where the fluid flows around centrally located magnetic field-creating assemblies:

| U.S. Pat. No. | Title | Inventor | Issue Date |
|---|---|---|---|
| 2,939,830 | WATER CONDITIONER | Green et al | June 7, 1960 |
| 3,669,274 | MAGNETIC STRUCTURE FOR TREATING LIQUIDS CONTAINING CALCAREOUS MATTER | Happ et al | June 13, 1972 |

Other fluid treating apparatus utilizing magnetic fields have used extremely precise low voltages wherein the voltage is directly applied to the water. The voltage is in the magnitude of less than 500 millivolts and is bi-polar. The electronic circuitry required to produce such a precise voltage is very sophisticated. Whenever one deals with such sophisticated electronic circuitry problems of great complexity can easily arise. One example of such an apparatus that uses the direct application of bi-polar low voltage is "The Salmo Scale Inhibitor" manufacture by the Salmo Corp., 1600 Rimrock Road, P.O. Box. 19127, Columbus, Ohio 43219.

Other fluid treating apparatus utilizing a magnetic field have used a "turbulence chamber" to mix water that was just passed through the magnetic field. The "turbulence chamber" is illustrated as being of a larger diameter than the tube in which the magnetic field is located. Problems related to installation easily arise where the apparatus is of several different diameters. One example of such an apparatus is the "No-Chem Rectifier" (manufacturer unknown). Another example is shown in the following U.S. Letters Patent:

| U.S. Pat. No. | Title | Inventor | Issue Date |
|---|---|---|---|
| 2,825,464 | WATER TREATMENT DEVICE | Mack | March 4, 1958 |

Other fluid treating apparatus utilizing magnetic fields have used the interaction of an externally applied static field and an internally rotating magnetic field created by a magnetized propeller inside the static field to treat fluids. The utilization of all of these moving parts can create maintenance problems. One example of such an apparatus is the "Electro-Mag" water conditioner manufactured by Electronic Water Conditioners, Inc., 3550 Biscayne Blvd., Miami, Fla. 33137.

Applicant is also aware of the existence of the following U.S. Patents:

| U.S. Pat. No. | Title | Inventor | Issue Date |
|---|---|---|---|
| 3,680,705 | MAGNETIC STRUCTURE FOR TREATING LIQUIDS CONTAINING CALCAREOUS MATTER | Happ et al | August 1, 1972 |
| 3,228,868 | PROCESS FOR THE CONVERSION OF HYDROGEN | Ruskin | January 11, 1966 |
| 3,206,657 | MAGNET ASSEMBLY FOR FILTERING | Moriya | September 14, 1965 |
| 2,937,710 | MAGNETIC DUST TRAPS OR FILTERS | MICHAEL et al | May 24, 1960 |
| Austrailian Patent No. | | | |
| 145,850 | (Unknown) | Veineiren | February 16, 1950 |

In the past, fluid treating apparatus utilizing magnetic fields (e.g. where the fluid is water) also have utilized a probe or screen that protrudes into the flowing fluid. One example of such an apparatus is the "Wateco Water De-Scaling System" manufactured by Water Technological Service, Inc., Suite 408 Westgage Plaza Building, 20325 Center Ridge Road, Cleveland, Ohio 44116. The utilization of probes or screens which protrude into the flowing fluid has caused problems. One of these problems has been the electronic shorting out of the fluid treating apparatus between the positive probe or screen and the negative body. Another problem is that the probes and/or screens have experienced the build-up of film and/or scale thereon with the result thereof being a loss of continuity within the electronics of the fluid treating apparatus. Further, the protrusion of the probe or screen into the flowing fluid restricts the free flow of the fluid, and such restriction has been found to be undesirable.

In the past, fluid treating apparatus have experienced problems due to the contamination of or damage to the operable parts thereof caused by the lack of protection for the operable parts. The fluid treating apparatus of the past have also experienced problems related to their inability to be quickly installed within a fluid transport system. Fluid treating apparatus of the past have also experienced problems with operating at an optimum when powered by alternating current. In some applications, such an apparatus is better operated on direct current or a pulsating direct current.

In light of all these problems with the fluid treating apparatus of the past, it would be a highly desirable solution to provide an improved fluid treating apparatus utilizing a magnetic field. It would be highly desirable to provide an improved fluid treating apparatus utilizing a magnetic field wherein no magnetic field-creating assembly baffles, coils, probes or screens are positioned in the fluid flow thereby to restrict the fluid flow through the apparatus. It would be highly desirable to provide an improved fluid treating apparatus utilizing a magnetic field that is simple in construction and/or that does not require sophisticated electronic circuitry. It would also be highly desirable to provide an improved fluid treating apparatus utilizing a magnetic field wherein the flow tube is of a consistent diameter. It would also be highly desirable to provide an improved fluid treating apparatus utilizing a magnetic field which is easily cleaned, rugged, has no moving parts, has a relatively low pressure drop from end to end and/or, does not require the fluid flow to be baffled for good performance.

Further, it would be highly desirable to provide an improved fluid treating apparatus utilizing an electrically generated magnetic field that includes protectively encapsulated operable parts which protects all parts from mechanical abuse and electrical breakdown and/or hazard. It would be highly desirable to provide an improved fluid treating apparatus utilizing a magnetic field that can be relatively quickly connected to a fluid transport system. It would also be highly desirable to provide an improved fluid treating apparatus utilizing a magnetic field that operates on pulsating direct current.

Finally it would be highly desirable to provide an improved fluid treating apparatus utilizing a magnetic field having most if not all of the above characteristics.

SUMMARY OF THE INVENTION

Thus, it is a principal objection of the invention to provide an improved fluid treating apparatus.

It is another object of the invention to provide an improved fluid treating apparatus that utilizes a magnetic field.

It is another object of the invention to provide an improved fluid treating apparatus that utilizes a magnetic field wherein the fluid is water.

It is another object of the invention to provide an improved fluid treating apparatus utilizing a magnetic field wherein the fluid is sewage.

It is another object of the invention to provide an improved fluid treating apparatus utilizing a magnetic field wherein the fluid is fuel (e.g. diesel fuel and gasoline).

It is another object of the invention to provide an improved fluid treating apparatus utilizing a magnetic field wherein the fluid is a flowable particulate material.

It is another object of the invention to provide an improved fluid treating apparatus utilizing a magnetic field wherein the fluid is a lime slurry.

It is another object of the invention to provide an improved fluid treating apparatus utilizing a magnetic field wherein no magnetic field-creating apparatus baffles, coils, probes or screens are positioned in the fluid flow thereby to restrict the fluid flow through the apparatus.

It is another object of the invention to provide an improved fluid treating apparatus utilizing a magnetic field that is simple in construction and/or does not require sophisticated electronic circuitry.

It is another object of the invention to provide an improved fluid treating apparatus utilizing a magnetic field wherein the flow tube is of a consistent diameter.

It is also an object of the invention to provide an improved fluid treating apparatus utilizing a magnetic field which is easily cleaned, rugged, has no moving parts, has a relatively low pressure drop from end to end and/or does not require the fluid flow to be baffled for good performance.

It is another object of the invention to provide an improved fluid treating apparatus utilizing a magnetic field that provides for the free and unobstructed flow of fluid therethrough.

It is another object of the invention to provide an improved fluid treating device utilizing an electrically generated magnetic field in which all operable parts are protectively encapsulated to protect all parts from mechanical abuse and electrical breakdown or hazard.

It is another object of the invention to provide an improved fluid treating apparatus utilizing a magnetic field that is quickly connected to a fluid transport system.

Finally, it is an object of the invention to provide an improved fluid treating apparatus utilizing a magnetic field that operates on pulsating direct current.

The invention is a fluid treating apparatus for use in a fluid treating system comprising an elongated non-magnetic tube having opposite ends. An insulated wire is wound in a multilayered closely packed helical fashion about the tube. A protective coating envelopes the wire and a portion of the tube.

BRIEF DESCRIPTION OF THE FIGURES

The above mentioned and other features and objects of this invention and the manner of attaining them will become more apparent and the invention itself will be best understood by reference to the following description of the invention taken in conjunction with the accompanying drawings wherein.

DETAILED DESCRIPTION OF A SPECIFIC EMBODIMENT

Figure 1:
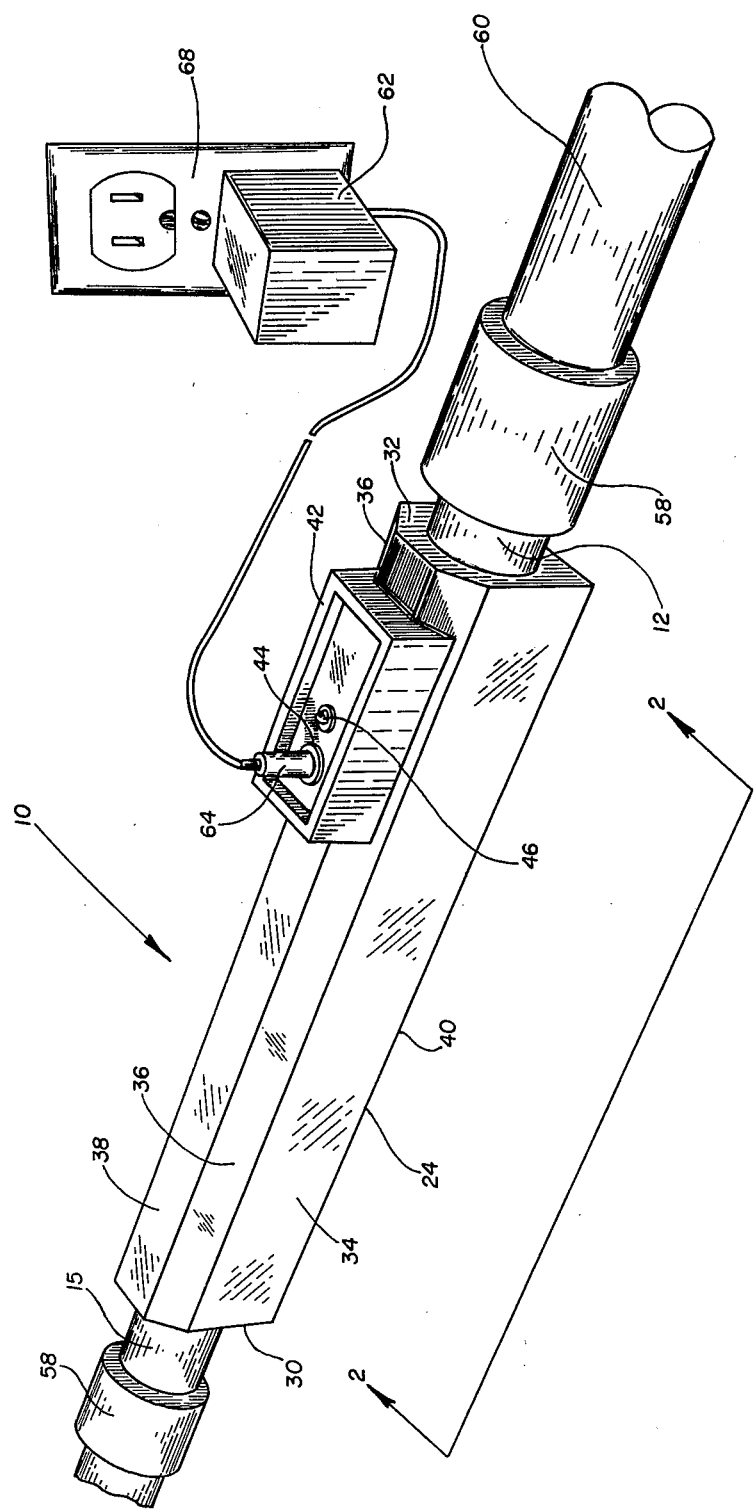
FIG. 1 is a perspective view of the apparatus of the invention fully installed in conjunction with peripheral equipment.
Figure 2:
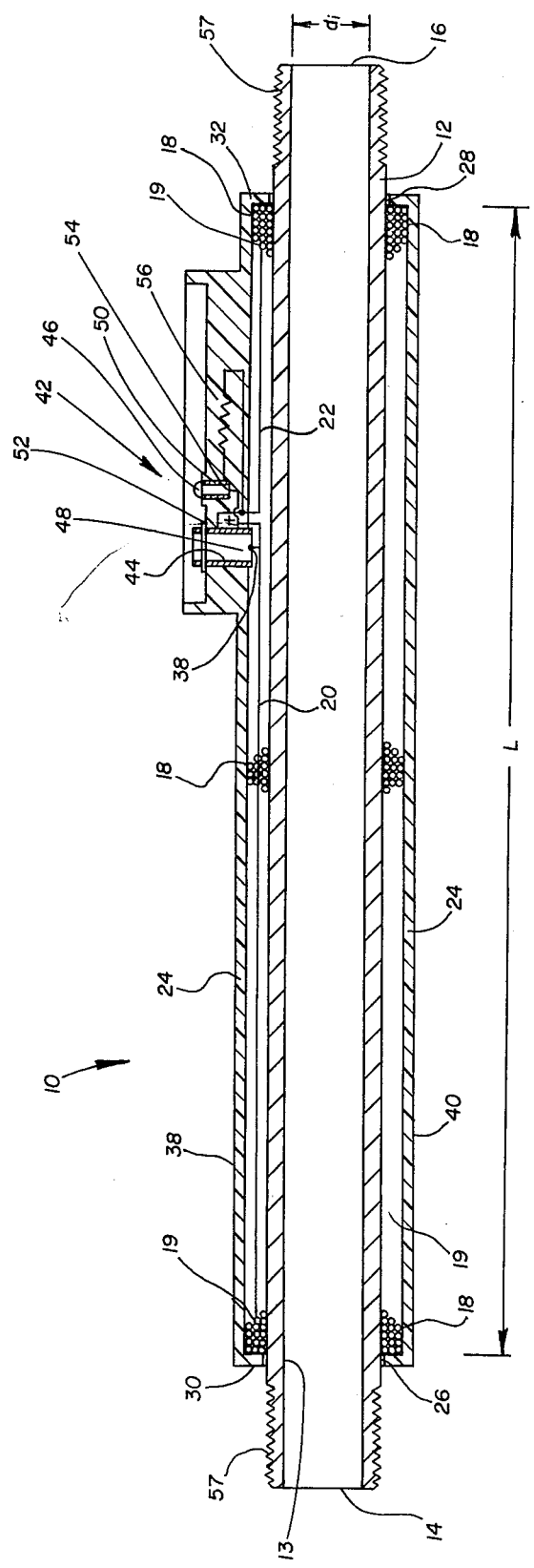
FIG. 2 is a cross-sectional view of only the fluid treating apparatus of the invention taken along section line 2—2 of FIG. 1.

Referring to FIGS. 1 and 2, the fluid treating apparatus 10 of the invention is illustrated. Fluid treating apparatus 10 includes an elongated tube 12 of a non-magnetic material having an interior cylindrical passageway 13, an exterior cylindrical surface 15 and opposite ends 14, 16. Passageway 13 is totally free from any obstructions or restrictions to fluid flow therethrough.

An insulated wire 18 wound in a multilayered closely packed helical winding 19 about the tube 12. Winding 19 extends from adjacent end 14 to adjacent end 16. Wire 18 has opposite ends 20 and 22 which are left free for electrical connections, to be described hereinafter.

Helical winding 19 of the wire 18 is encapsulated in an electrically insulating resinous material to both mechanically hold the winding 19 in place and to protect the winding from mechanical abuse and electrical breakdown. The resinous material forms a protective covering 24 which completely envelopes winding 19, the electronics of the apparatus 10, which will be described hereinafter, and portions 26, 28 on both sides of winding 19 and between winding 19 and tube ends 14, 16 respectively. The covering 24 is shown to have opposite ends 30 and 32, upstanding sides 34 with angularly disposed side portions 36, and top 38 and bottom 40 surfaces. Ends 30 and 32 of covering 24 are spaced from the opposite ends 14, 16 of the tube 12 to allow for the coupling of the tube 12 to a fluid system as will be mentioned hereinafter.

Covering 24 is provided with a boss 42 which upstands from top surface 38 of the covering 24. Boss 42 has embedded therein a conventional socket 44 and a conventional lamp 46. Socket 44 and lamp 46 both have a pair of terminals which are electrically connected to the winding 19 of the wire 18. End 20 of wire 18 is connected to both terminal 48 of socket 44 and terminal 50 of the lamp 46. End 22 of wire 18 is similarly connected to terminal 52 of the socket 44 and to terminal 54 of the lamp 46 through a resistor 56. Resistor 56 protects the lamp 46 from the full current applied to wire 18. All of these electrical components are encapsulated in the resinous material forming protective covering 24.

In the specific embodiment illustrated, tube 12 at the opposite ends 14, 16 thereof is provided with threads 57 for connection to a fluid system 60 by connectors 58. In another specific embodiments, other conventional pipe or tube connectors can be utilized. Connectors 58 usually vary with the tube 12. Tube 12 in specific embodiments can be a conventional polyvinyl chloride pipe, copper tubing or pipe, non-magnetic stainless steel pipe or any tubing or pipe of non-magnetic material. Similarly while any electrical insulating and encapsulating material can be used to form the protective covering 24, a polyurethane resin material is used in a specific embodiment due to its physical and electrical properties, its cost, and appearance.

In operation, the fluid treating apparatus 10 is connected the opposite ends 14, 16 of the tube 12 by connectors 58 to a fluid system 60. The fluid of the system to be treated passes through the tube 12 and through the magnetic field created by energizing the winding 19. Winding 19 is energized by applying a current to the winding 19. As shown in FIG. 1, this may be accomplished by use of a conventional AC/DC rectifier 62 with an apparatus plug 64 connected to a conventional 115 volt electrical outlet 68.

By positioning apparatus plug 64 in the socket 44 of apparatus 10 and rectifier 62 in outlet 48, winding 19 is energized and a magnetic field is created within the tube 12. The strength of the magnetic field varies with the length L of the winding 19, the diameter di of the tube 12, the gauge of the wire 18 the number of turns of the winding 19, and the current flowing through the wire 18.

Whenever winding 19 is energized, lamp 46 is lit. Thus, an operator can monitor the operation of the apparatus 10 by viewing the lamp 46. In some applications, it has been found that pulsating DC current through winding 19 will enhance the operation of the apparatus 10 of the invention. If pulsating DC current is desired, a pulsator can be incorporated in either the rectifier 62 or the apparatus 10 of the invention.

Thus it can be seen that the invention provides an improved fluid treating apparatus. The apparatus utilizes an electrically generated magnetic field created by direct current flowing through the windings 19. Apparatus 10 can be used to treat recycled fluid or in a single pass operation. Properly installed, the apparatus 10 can be either suspended between connectors 58 as shown in FIG. 1 or be supported by surfaces 34, 36 or bottom surface 40 on any suitable suppo9ting surface. The fluid to be treated flows through the tube 12 and through the magnetic field. The apparatus is useful in treating water, sewage, diesel fuel and gasoline, particulate material and lime slurries to either inhibit build-up of sludge or scale or alter the consistency of the sludge or scale or to enhance the flow of the material.

The following examples are presented herewith to more fully illustrate the present invention. While a specific embodiment of the fluid treating apparatus is described in these examples, it should be understood that other apparatus made in accordance with the invention as disclosed herein, could be used to achieve these same results.

EXAMPLE 1

A fluid apparatus 10 made in accordance with the invention disclosed herein having a length L to diameter di ratio of about 10 to 1, a winding 19 including about 480 turns of 25 gauge, polyurethane-polyamide insulated, class 130 magnet wire 18 and a rectifier 62 applying to the winding 19 about 50 milliamps at a volatage of 3 volts was installed in a water line to a heat exchanger. Previously, scale build-up was experienced to a degree that during the summer months, scale would have to be cleaned out of the heat exchanger once every two weeks and during the winter months, scale would have to be cleaned out of the heat exchanger every three to four weeks. After operation for about six (6) months, no scale build-up has been experienced.

EXAMPLE 2

The apparatus 10 of Example 1 was installed in a line through which plastic particulate material in the form of dust and fines are pumped in air to a fines separater. In the past, static electricity has built-up on the particules causing clogging in the line. While various techniques have been used to reduce this problem, a one percent or two percent increase in the separation of dust from fines is considered outstanding. With the use of the fluid treating apparatus 10 of the invention a 13 percent to 30 percent increase was achieved.

EXAMPLE 3

The apparatus 10 of Example 1 was installed in a lime slurry line in a sewage disposal plant. In the past, this line had clogged several times each week which required the installation of several other lines such that the clogged lines could be routinely cleaned. After the installation of the fluid treating apparatus 10 of the invention, these lime slurry lines having the apparatus 10 of the invention installed therein required no cleaning after 8 months of operations.

The apparatus of the invention is preferred over prior fluid treating apparatus inasmuch as there are no baffles, coils, probes, screens or magnetic field creating devices positioned in the fluid flow. In the apparatus of the invention, fluid flows through the tube 12 totally unrestricted. The apparatus of the invention is simple in construction and does not require sophisticated electronic or magnetic field forming equipment. The apparatus of the invention is easily removed from the line in which it is installed and cleaned by conventional methods. The apparatus of the invention is rugged, has no moving parts, and has an extremely low pressure drop from end to end when compared to other such devices.

Further the winding 19 of the wire 18, all connections therebetween with the socket 44 and the lamp 46 are encapsulated in a resinous material and totally enclosed so as to protect all parts from mechanical abuse, and electrical breakdown or electrical hazard.

While there have been described above the principles of this invention in connection with specific apparatus, it is to be clearly understood that this description is made only by way of example and not as a limitation to the scope of the invention.

What is claimed is:

1. A fluid treating apparatus comprising an elongated tube of non-magnetic material having opposite ends and an interior passageway, said passageway extending between said opposite tube ends and being totally free of obstructions and restrictions to fluid flow therethrough, an insulated magnet wire wound around said tube into a closely packed and multilayered helical winding extending from adjacent to one of said tube ends to adjacent to the other of said tube ends, a protective covering of electrically insulating material extending over said winding and a portion of said tube on both sides of said winding between said winding and said one and other tube ends, respectively, a voltage source connector embedded in said insulating material, said connector being connected across the opposite ends of said wire, said protective covering encapsulating the connections between said voltage source connector and said wire, an AC/DC rectifier having a connector attached thereto,—said rectifier connector being joined in electrical communication with said voltage source connector, said rectifier being adapted to be connected to an AC voltage source.

2. A fluid treating apparatus comprising an elongated tube of non-magnetic material having opposite ends and an interior passageway, said passageway extending between said opposite tube ends and being totally free of obstructions and restrictions to fluid flow therethrough, an insulated magnet wire wound around said tube into a closely packed and multilayered helical winding extending from adjacent to one of said tube ends to adjacent to the other of said tube ends, a protective covering of electrically insulating material extending over said winding and a portion of said tube on both sides of said winding between said winding and said one and other tube ends, respectively, a voltage source connector embedded in said insulating material, said connector being connected across the opposite ends of said wire, said protective covering encapsulating the connections between said connector and said wire, and a source of pulsating DC voltage electrically connected to said voltage source connector.

3. The apparatus of claim 1 or 2 wherein said passageway has a diameter and said winding is elongated with a length dimension which extends longitudinally of said tube, and the ratio of the length of said winding to said passageway diameter is about 10 to 1.

4. The apparatus of claim 1 or 2 further comprising an indicator, said indicator being embedded in said insulating material, said indicator being connected to said wire, the connections between said wire and indicator being embedded in said insulating material whereby the energization of said winding can be determined from said indicator.

5. The apparatus of claim 4 wherein said passageway has a diameter and said winding is elongated with a length dimension which extends longitudinally of said tube, and the ratio of the length of said winding to said passageway diameter is about 10 to 1.

6. The apparatus of claim 1 or 2 wherein said insulating material is chosen from the group consisting of electrically insulating encapsulating resins said tube is of a non-magnetic material chosen from the group consisting of copper, polyvinyl chloride, and stainless steel.

* * * * *